United States Patent
Kuhnert

(10) Patent No.: US 11,715,934 B2
(45) Date of Patent: Aug. 1, 2023

(54) PRECHAMBER SPARK PLUG, IGNITION ELECTRODE FOR A PRECHAMBER SPARK PLUG AND METHOD FOR PRODUCING AN IGNITION ELECTRODE

(71) Applicant: DKT VERWALTUNGS-GMBH, Walldorf (DE)

(72) Inventor: Steffen Kuhnert, Heidelberg (DE)

(73) Assignee: DKT VERWALTUNGS-GMBH, Walldorf (DE)

( * ) Notice: Subject to any disclaimer, the term of this patent is extended or adjusted under 35 U.S.C. 154(b) by 0 days.

(21) Appl. No.: 17/615,822

(22) PCT Filed: Jan. 26, 2021

(86) PCT No.: PCT/DE2021/200004
§ 371 (c)(1),
(2) Date: Dec. 1, 2021

(87) PCT Pub. No.: WO2021/219169
PCT Pub. Date: Nov. 4, 2021

(65) Prior Publication Data
US 2023/0038893 A1    Feb. 9, 2023

(30) Foreign Application Priority Data

Apr. 27, 2020    (DE) .......................... 102020205320.0

(51) Int. Cl.
*H01T 13/54*    (2006.01)
*H01T 13/46*    (2006.01)
(Continued)

(52) U.S. Cl.
CPC ........... *H01T 13/467* (2013.01); *H01T 13/39* (2013.01); *H01T 13/54* (2013.01); *H01T 21/02* (2013.01)

(58) Field of Classification Search
CPC ........ H01T 13/46; H01T 13/467; H01T 13/54
(Continued)

(56) References Cited

U.S. PATENT DOCUMENTS

| 5,554,908 A * | 9/1996 | Kuhnert ................... H01T 13/54 |
| | | 313/142 |
| 6,608,430 B1 * | 8/2003 | Schaus ................... H01T 13/467 |
| | | 313/140 |

(Continued)

FOREIGN PATENT DOCUMENTS

| DE | 102010032412 A1 | 2/2012 |
| DE | 102015207042 A1 | 10/2016 |

(Continued)

OTHER PUBLICATIONS

International Search Report for International Application No. PCT/DE2021/200004, dated May 25, 2021.

(Continued)

*Primary Examiner* — Christopher M Raabe
(74) *Attorney, Agent, or Firm* — Marshall, Gerstein & Borun LLP

(57) ABSTRACT

A prechamber spark plug having a housing, which at its front end comprises a prechamber with an ignition electrode arranged therein, wherein the ignition electrode comprises a base and electrode legs protruding from the base, wherein the ignition electrode is machined from a sheet made of an iridium alloy and the legs are bent out of the plane of the base to form a basket shape, characterized in that the ignition electrode, in particular the electrode legs, is/are separated out of the sheet metal by means of laser cutting. Furthermore, a corresponding ignition electrode and a method for producing such an ignition electrode are claimed.

17 Claims, 5 Drawing Sheets

Figure 1:
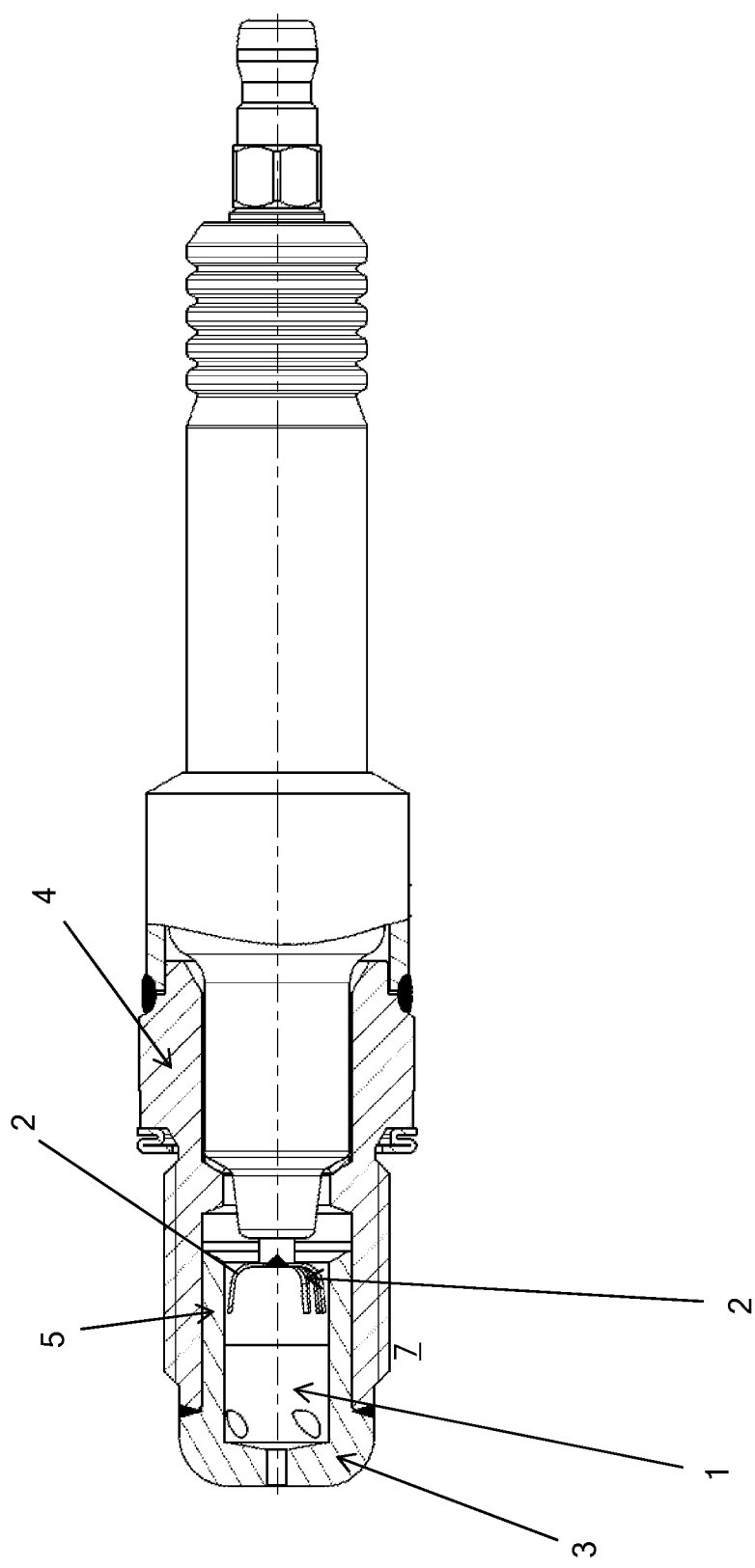

(51) Int. Cl.
*H01T 13/39* (2006.01)
*H01T 21/02* (2006.01)

(58) Field of Classification Search
USPC .......................................................... 313/140
See application file for complete search history.

(56) References Cited

U.S. PATENT DOCUMENTS

| 2011/0215703 | A1* | 9/2011 | Maul | H01T 13/54 |
| | | | | 445/7 |
| 2012/0025689 | A1* | 2/2012 | Kuhnert | H01T 13/39 |
| | | | | 313/140 |
| 2012/0055434 | A1* | 3/2012 | Giffels | F02P 15/08 |
| | | | | 123/169 R |
| 2012/0133264 | A1* | 5/2012 | Morin | H01T 13/54 |
| | | | | 313/141 |
| 2016/0254650 | A1* | 9/2016 | Maul | H01T 13/54 |
| | | | | 123/169 EL |
| 2017/0145898 | A1* | 5/2017 | Schäfer | F02P 13/00 |
| 2017/0358906 | A1* | 12/2017 | Kuhnert | H01T 13/54 |
| 2019/0376441 | A1* | 12/2019 | Brubaker | F02P 13/00 |
| 2020/0036166 | A1* | 1/2020 | Kuhnert | H01T 21/02 |

FOREIGN PATENT DOCUMENTS

| EP | 2413442 A2 | 2/2012 |
| WO | WO-2014/177169 A1 | 11/2014 |

OTHER PUBLICATIONS

International Preliminary Report on Patentability and translation of Written Opinion of the International Searching Authority for Application No. PCT/DE2021/200004, dated Oct. 10, 2022.

* cited by examiner

PRECHAMBER SPARK PLUG, IGNITION ELECTRODE FOR A PRECHAMBER SPARK PLUG AND METHOD FOR PRODUCING AN IGNITION ELECTRODE

CROSS-REFERENCE TO RELATED APPLICATION

This present application is the US national phase of International Patent Application No. PCT/DE2021/200004, filed Jan. 26, 2021, which claims priority to German Application No. 102020205320.0, filed Apr. 27, 2020. The priority application, DE 102020205320.0, is hereby incorporated by reference in its entirety.

The invention relates to a prechamber spark plug having a housing which has a prechamber having an ignition electrode arranged therein at its front end, wherein the ignition electrode comprises a base and electrode legs protruding from the base, wherein the ignition electrode is machined from a sheet made of an iridium alloy and the legs are bent out of the plane of the base to form a basket shape.

The invention also relates to an ignition electrode for a prechamber spark plug and a method for producing such an ignition electrode.

Prechamber spark plugs of the type in question are well known from practice. Reference is made to EP 2 413 442 B1 by way of example only.

The known prechamber spark plug has a housing which comprises a prechamber having several openings at its front end. An arc discharge can be used to ignite a fuel-air mixture in the prechamber, so that a burning gas mixture emerges from the openings in the prechamber in the form of so-called torch jets and the fuel-air mixture ignites in the combustion chamber of an engine.

An insulator carrying an ignition electrode is arranged in the housing of such a prechamber spark plug. The ignition electrode in prechamber spark plugs is sometimes referred to as the center electrode or the electrode carrier. The ignition electrode has several electrode legs which, starting from the base, initially extend radially outward and run with a subsequent portion along an antechamber wall. This front section of the electrode legs forms a spark gap for an arc discharge between itself and the prechamber wall. The prechamber wall can have inwardly directed projections, for example nubs, etc., which face the electrode legs. The spark gap for the arc discharge is also defined in such a case between the front section of the electrode legs and the front chamber wall, more precisely between the electrode legs and the wall projection.

One advantage of prechamber spark plugs is their long service life compared to other spark plug types and their very good ignition behavior. These advantages are based, inter alia, on the fact that the ignition electrode comprises several electrode arms, from each of which an arc originates.

The electrode legs are regularly punched out and then bent into a basket shape. This is only possible without problems if the material of the ignition electrode, in particular the electrode legs, is not too brittle.

According to the prior art, it has been found that ignition electrodes made of an iridium alloy have little wear during operation due to their high melting point. However, the advantageously high melting point of iridium and iridium-based alloys is linked to extremely brittle material properties. In particular, when reshaping or bending the electrode legs, cracks occur which can lead to the legs breaking off during reshaping.

This problem has hitherto been countered by making the electrode legs very wide, for example 0.9 mm wide. With a smaller thickness, the leg cross-section was therefore extremely "rectangular." Such a configuration results in considerable disadvantages in operation. Such a poor ratio of cross-sectional circumference to cross-sectional area of the individual legs leads to high heat transfer with poor heat dissipation. When igniting, the spark usually comes from the corners and edges of the electrodes. A high number of sharp corners/edges reduces the ignition voltage requirement. Because of this situation, the legs round off very quickly and the ignition voltage requirement increases. This in turn leads to increased wear.

The present invention is therefore based on the object of specifying a prechamber spark plug of the generic type, i.e. having an ignition electrode made of an iridium alloy, in which particularly filigree electrode legs are free of cracks, regardless of the relatively brittle iridium alloy. In addition, a corresponding ignition electrode and a method for producing the ignition electrode are to be specified.

The above object is achieved in relation to the prechamber spark plug by the features of claim 1. Accordingly, the ignition electrode and, in particular, the electrode legs of the ignition electrode are separated out of the sheet metal by means of laser cutting.

In contrast to the prior art, the ignition electrode, including the base and the electrode legs, is not punched from a sheet made of an iridium alloy, but rather the ignition electrode blank is separated or cut out of the sheet by means of laser cutting. Laser cutting instead of punching means that there are no cracks whatsoever, especially at the edges of the electrode cross. Starting from a crack-free blank—comprising the base and several electrode legs—the electrode legs can be formed better because the blank is free from cracks. In this way, an ignition electrode can be produced without the disadvantages described in the prior art, which are predominantly due to the formation of cracks in the conventional punching process.

The legs can be bent approximately orthogonally out of the plane of the base. The legs are advantageously bent out of the plane of the base at an angle of <90°, preferably 81° to 89°. This means that the "basket" formed in this way widens at least slightly towards the free end of the legs. Within the prechamber, this means that the legs approach the inner wall of the antechamber and thus the ground electrode with their free end. This supports the ignition behavior.

Furthermore, it is advantageous if the electrode legs are reshaped or bent into their final shape, namely brought into the basket shape of the ignition electrode, by hot bending. This measure counteracts the formation of cracks during reshaping.

As already stated above, the ignition electrode consists of an iridium alloy, in particular an iridium-based alloy that has at least 50 wt. % iridium. For example, the ignition electrode can be made of IrRh5, or of IrRh10 or of IrRh3Nb1, etc. These alloys have the advantage of a high melting point, which leads to comparatively little wear during operation of the ignition electrode.

The ignition electrode comprises at least two erected electrode legs. It can include, for example, four, six or eight electrode legs, which are designed as filigree as possible.

It is also conceivable that the ignition electrode comprises an arrangement of two individual electrodes which are arranged one above the other or one behind the other, wherein the number of respective electrode legs per ignition electrode are identical or also may differ from one another. The ignition electrodes combined with one another may be welded to one another with or without a spacing from one another. The ignition electrodes are permanently assigned to one another.

In addition, it is conceivable that the individual electrodes with their electrode legs are twisted with respect to one another, so that the electrode legs are not aligned and complement each other in the bent state to form the basket shape. The arrangement of two ignition electrodes combined with one another leads to a provision of preferably eight to twelve electrode legs in total, at the ends of which an arc discharge can take place.

The electrode legs of an ignition electrode can be identical or different. They are preferably approximately square in cross section. It is advantageous if the electrode legs have a thickness in the range from 0.2 mm to 0.5 mm and a width in the range from 0.3 mm to 0.6 mm. This results in a ratio of thickness/width in the range from 0.33 to 1.67. A preferred range has a ratio of 0.4 (slightly rectangular) to 1.0 (square).

Since cracks are avoided during production, regardless of the material, the electrode legs can be designed as filigree as possible.

With regard to the ignition electrode according to the invention, the underlying object is achieved by the subordinate claim 13, according to which the ignition electrode is separated out of the sheet metal by means of laser cutting. All other features of the ignition electrode have already been discussed above.

The method according to the invention is achieved by the features of the additional subordinate claim 14, according to which the ignition electrode is cut out of the sheet metal by means of laser cutting. Further process-specific features have also already been set out above, so that further explanations are not necessary.

Figure 2:
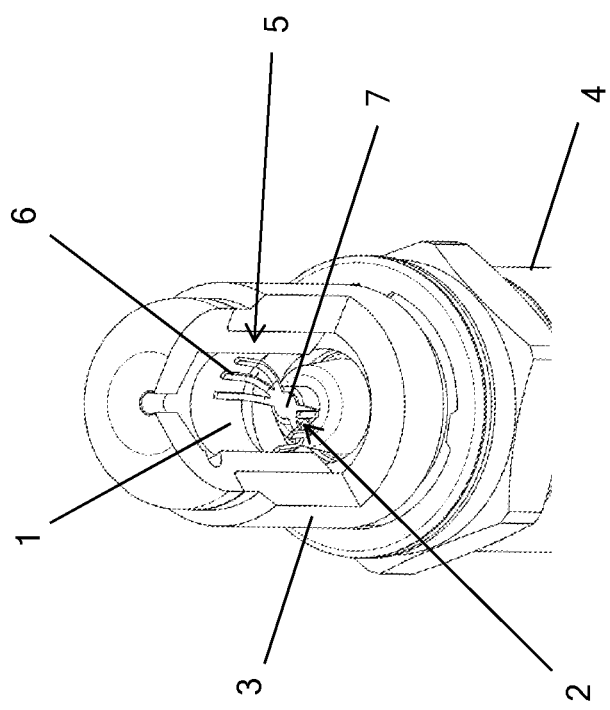
Figure 4:
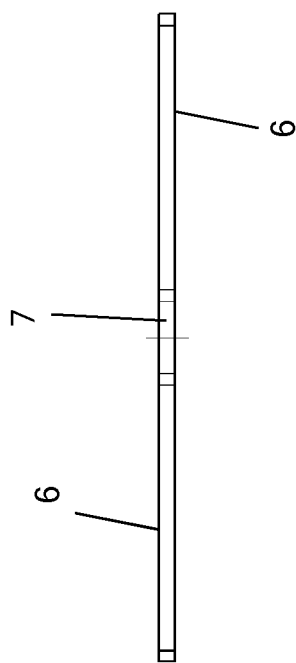
Figure 3:
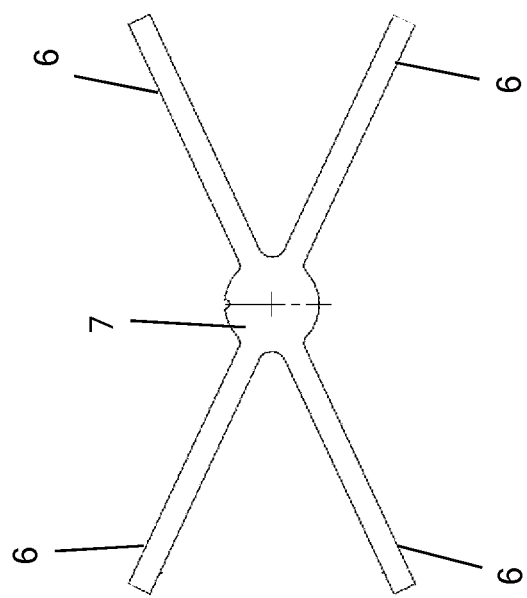
Figure 7:
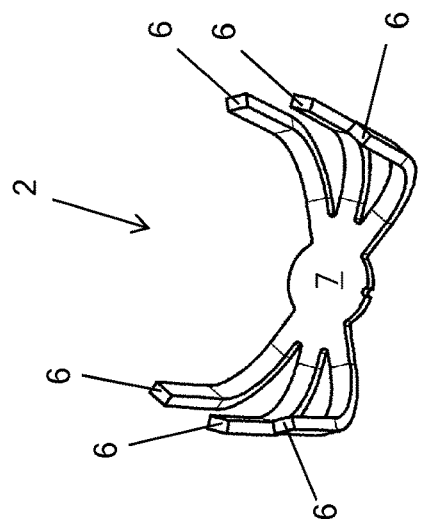
Figure 6:
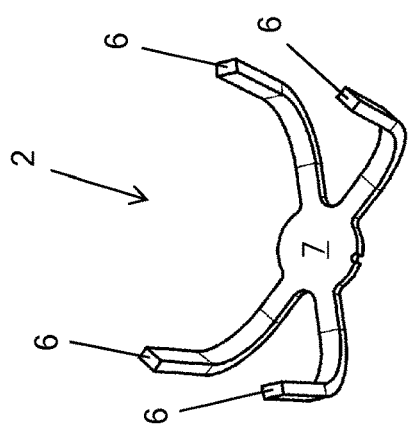
Figure 5:
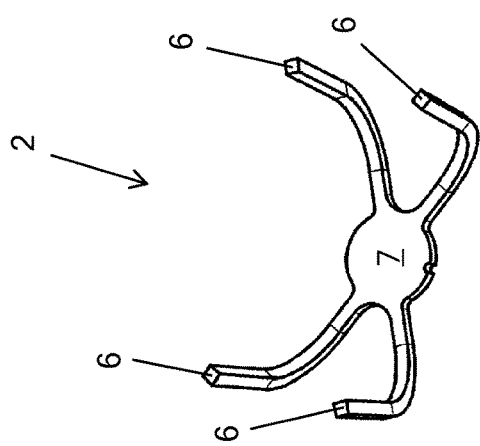
Figure 9:
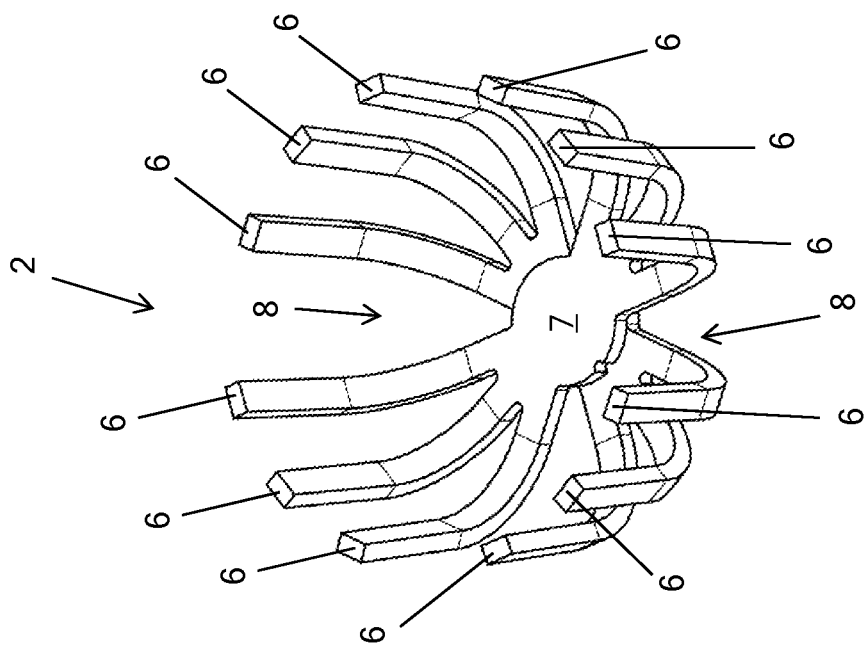
Figure 8:
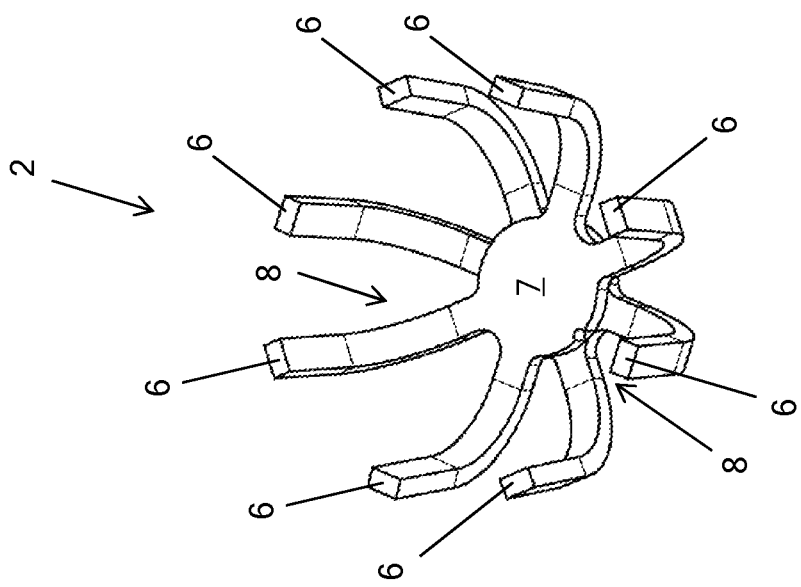

There are now various possibilities for designing and developing the teaching of the present invention in an advantageous manner. For this purpose, reference is made on the one hand to the claims dependent on claim 1 and on the other hand to the following explanation of preferred embodiments of the invention with reference to the drawings. In conjunction with the explanation of the preferred embodiments of the invention with reference to the drawings, generally preferred embodiments and developments of the teaching are also explained. In the drawings:

FIG. 1 is a schematic view, partially in section, of an embodiment of a prechamber spark plug, FIG. 2 is a schematic view, partially broken away, of a view into the prechamber of the prechamber spark plug, FIG. 3 is a schematic top view of the blank of an ignition electrode having four electrode legs produced by means of laser cutting, FIG. 4 is a schematic side view of the object from FIG. 3, FIG. 5 is a schematic view of an ignition electrode comprising four electrode legs, with electrode legs bent into a basket and with an approximately square cross-section, FIG. 6 is a schematic view of an ignition electrode comprising four electrode legs, with electrode legs bent into a basket and having an approximately rectangular cross-section, FIG. 7 is a schematic view of an ignition electrode comprising six electrode legs, with electrode legs bent into a basket and with an approximately rectangular cross-section, FIG. 8 is a schematic view of the combination of two electrodes, each having four electrode legs, and FIG. 9 is a schematic view of the combination of two electrodes, each having six electrode legs.

FIG. 1 shows the basic structure of a prechamber spark plug, wherein the present invention only deals with the prechamber 1 and the ignition electrode 2 arranged therein.

The prechamber 1 is essentially formed by the end cap 3, which is equipped with overflow bores. The cap 3 is welded to a housing 4. In addition, a ground electrode 5 is formed by the inner wall of the cap 3. For the function of the prechamber spark plug, reference is made to the prior art mentioned in the introduction to the description.

FIG. 2 shows a view into the prechamber 1, wherein the cap 3 with the ground electrode 5 can be seen. The ignition electrode 2 is seated in the interior of the prechamber 1 and, in the embodiment shown in FIG. 2 as ignition electrode 2 having a total of six electrode legs 6. The electrode legs 6 are bent away from their base 7 in a basket shape.

FIG. 3 shows, in a schematic plan view, the blank cut out from a sheet metal by laser cutting, wherein the sheet metal is made of an iridium alloy. It is a blank, from the base 7 from which a total of four electrode legs 6 extend away. The electrode legs 6 are arranged in pairs and may be aligned with one another at an angle of 20 degrees to 70 degrees. The electrode legs 6 can have a length between 6 mm and 16 mm and a thickness or width of 0.3 mm to 0.6 mm.

FIG. 4 shows the object from FIG. 3 in a side view, according to which the electrode legs 6 extend outward from the base 7, in the still unbent state.

FIG. 5 shows a schematic view of an ignition electrode 2 which is bent from the blank according to FIGS. 3 and 4. The electrode legs 6 are bent by hot bending until the electrode legs 6 define the basket shape and are bent more or less orthogonally from the base 7 toward the free end. According to FIG. 5, the cross section of the electrode legs 6 is approximately square.

The ignition electrode 2 according to FIG. 6 differs from the ignition electrode 2 from FIG. 5 in that the electrode legs 6 are made somewhat wider than they are thick. The cross section is roughly rectangular.

FIG. 7 shows an ignition electrode 2 having a total of six electrode legs 6, wherein three of the electrode legs 6 are formed close to one another and in two groups of three opposite one another. As in the embodiment according to FIG. 6, the cross section is rather rectangular.

FIG. 8 shows an ignition electrode 2, which consists of a combination of two individual electrodes 8, each having four electrode legs 6. The individual electrodes 8 are permanently and directly welded to one another and complement one another to form an ignition electrode 2 having a total of eight electrode legs 6.

FIG. 9 shows the combination of two individual electrodes 8, wherein each individual electrode 8 has six electrode legs 6. Overall, the combination of the two individual electrodes 8 results in an ignition electrode 2 having twelve electrode legs 6.

With an increased number of electrodes, there is a considerable wear reserve, which increases the service life of the ignition electrode 2.

In relation to FIGS. 1 and 5 to 9, it should be noted with regard to the alignment of the electrode legs 6 that they are bent out of the plane of the base 2 at an angle <90°, wherein the angle preferably is in the range between 81° and 89°, so that in the installed state according to FIGS. 1 and 2, the electrode legs 6 approach the ground electrode 5 or the inner wall of the cap 3 toward the free end. The "basket" formed in this way widens toward the free end of the electrode legs 6.

With regard to further advantageous embodiments of the teaching according to the invention, reference is made to avoid repetition to the general part of the description and to the appended claims.

Finally, it should be expressly noted that the above-described embodiments of the teaching according to the invention are merely used for the purpose of discussing the claimed teaching, but not limited to the embodiments.

LIST OF REFERENCE SIGNS

1 Prechamber
2 Ignition electrode (center electrode or base with electrode legs)
3 Cap
4 Housing
5 Ground electrode (inner wall of the cap)
6 Electrode legs (the ignition electrode)
7 Base (center electrode of ignition electrode)
8 Single electrode (for combination with a second single electrode)

The invention claimed is:

1. A prechamber spark plug having a housing, which at its front end comprises a prechamber having an ignition electrode arranged therein, wherein the ignition electrode comprises a base and electrode legs protruding from the base, wherein the ignition electrode is machined from a sheet made of an iridium alloy and the legs are bent out of the plane of the base to form a basket shape, the ignition electrode separated out of the sheet metal by means of laser cutting, wherein the electrode legs have a thickness in a range from 0.2 mm to 0.5 mm and a width in a range from 0.3 mm to 0.6 mm, which gives a ratio of thickness/width in a range of 0.33 to 1.67.

2. The prechamber spark plug according to claim 1, the legs being bent approximately orthogonally out of the plane of the base.

3. The prechamber spark plug according to claim 1, the legs being bent out of the plane of the base at an angle <90°, preferably 81° to 89°.

4. The prechamber spark plug according to claim 1, the electrode legs being bent into their basket shape by means of hot bending.

5. The prechamber spark plug according to claim 1, the ignition electrode consists of one of a group including IrRh5, IrRh10 and IrRh3Nb1.

6. The prechamber spark plug according to claim 1, the electrode comprises four, six or eight electrode legs.

7. The prechamber spark plug according to claim 1, the ignition electrode comprises an arrangement of two individual electrodes one above the other or one behind the other, wherein the number of the respective electrode legs are identical or different from one another.

8. The prechamber spark plug according to claim 7, the ignition electrodes are welded to one another with or without a spacing from one another.

9. The prechamber spark plug according to claim 7, the arrangement of two ignition electrodes comprises a total of eight or twelve electrode legs.

10. The prechamber spark plug according to claim 7, the individual electrodes with their electrode legs are twisted relative to one another, so that the electrode legs are not aligned and complement each other in the bent state to form the basket shape.

11. The prechamber spark plug according to claim 1, the electrode legs are approximately square in cross section.

12. The prechamber spark plug according to claim 1, the electrode legs have a thickness in the range from 0.2 mm to 0.5 mm and a width in the range from 0.3 mm to 0.6 mm, which gives a ratio of thickness/width in the range of 0.33 to 1.67 with a range of 0.4 (slightly rectangular) to 1.0 (square).

13. An ignition electrode for a prechamber spark plug, which is arranged in a housing comprising a prechamber, wherein the ignition electrode comprises a base and electrode legs protruding from the base and is machined from a sheet made of an iridium alloy and the legs are bent away approximately orthogonally to the base to form a basket shape the ignition electrode is separated out of the sheet metal by means of laser cutting, wherein the electrode legs have a thickness in a range from 0.2 mm to 0.5 mm and a width in a range from 0.3 mm to 0.6 mm, which gives a ratio of thickness/width in a range of 0.33 to 1.67.

14. A method for producing an ignition electrode for a prechamber spark plug comprising a base and electrode legs protruding from the base, wherein the ignition electrode is cut out of a sheet made of an iridium alloy and the legs are subsequently bent approximately orthogonally to the base to form a basket shape, the ignition electrode is cut out of the sheet metal by means of laser cutting, and wherein the electrode legs have a thickness in a range from 0.2 mm to 0.5 mm and a width in a range from 0.3 mm to 0.6 mm, which (lives a ratio of thickness/width in a ramie of 0.33 to 1.67.

15. The prechamber spark plug of claim 1, wherein the ratio of thickness/width is in the range of 0.4 to 1.0.

16. The ignition electrode of claim 13, wherein the ratio of thickness/width is in the range of 0.4 to 1.0.

17. The method of claim 14, wherein in cutting the ignition electrode, the ratio of thickness/width is in the range of 0.4 to 1.0.

* * * * *